United States Patent [19]

Scott

[11] 4,253,604
[45] Mar. 3, 1981

[54] PNEUMATIC CONTROL MEANS FOR A VEHICLE HEAT EXCHANGER SYSTEM OR THE LIKE

[75] Inventor: Douglas S. Scott, Knoxville, Tenn.

[73] Assignee: Robertshaw Controls Company, Richmond, Va.

[21] Appl. No.: 43,346

[22] Filed: May 29, 1979

Related U.S. Application Data

[63] Continuation-in-part of Ser. No. 864,455, Dec. 27, 1977, Pat. No. 4,194,687.

[51] Int. Cl.³ .............................................. G05D 23/08
[52] U.S. Cl. ........................................ 236/87; 137/85; 236/49
[58] Field of Search ....................... 236/87, 86, 49, 51; 137/82, 85

[56] References Cited

U.S. PATENT DOCUMENTS

| | | | |
|---|---|---|---|
| 2,529,875 | 11/1950 | Howard | 236/51 |
| 3,212,710 | 10/1965 | Nilles | 236/87 X |
| 3,263,925 | 8/1966 | Joesting | 236/87 X |
| 3,377,022 | 4/1968 | Beatenbough et al. | 236/86 X |
| 3,580,502 | 5/1971 | Duchek | 236/86 X |
| 3,770,125 | 11/1973 | Franz | 236/87 X |
| 4,007,775 | 2/1977 | Caldwell | 236/49 X |
| 4,007,873 | 2/1977 | Duchek | 236/87 X |

Primary Examiner—William E. Tapolcai, Jr.
Attorney, Agent, or Firm—Candor, Candor & Tassone

[57] ABSTRACT

A thermostat construction having a valve unit for directing a pneumatic signal to a pneumatically operated control device in relation to the force differential between the temperature sensed by the temperature sensing unit thereof and the temperature setting of a temperature setting unit thereof, a lever being pivotally mounted to the construction and being operatively interconnected to the valve unit at a first portion of the lever and to the temperature setting unit and the temperature sensing unit at a second portion of the lever. A pneumatically operated positioning construction having a valve unit for directing a pneumatic signal to a positioning chamber thereof in relation to the force differential between a pneumatically operated setting unit thereof and a feedback unit of the positioning chamber, a lever being pivotally mounted to the construction and being operatively interconnected to the valve unit at a first portion of the lever and to the setting unit and the feedback unit at a second portion of the lever.

18 Claims, 8 Drawing Figures

PNEUMATIC CONTROL MEANS FOR A VEHICLE HEAT EXCHANGER SYSTEM OR THE LIKE

CROSS REFERENCE TO RELATED APPLICATION

This application is a continuation-in-part application of its copending parent patent application, Ser. No. 864,455, filed Dec. 27, 1977, now U.S. Pat. No. 4,194,687.

BACKGROUND OF THE INVENTION

1. Field of the Invention

This invention relates to improved pneumatically operated control means for a vehicle transportation system or the like and, in particular, to an improved thermostat construction therefor and to an improved pneumatically operated positioning construction therefor.

2. Prior Art Statement

It is known to provide a thermostat construction having valve means for directing a pneumatic signal to a pneumatically operated control device in relation to the force differential between the temperature sensed by a temperature sensing means thereof and a temperature setting of a temperature setting means thereof.

For example, see the following two items:

(1) U.S. Pat. No. 3,263,925—Joesting
(2) Copending patent application Ser. No. 864,674, filed Dec. 27, 1977—Frankenberg, now U.S. Pat. No. 4,192,453.

It appears that the thermostat construction of items (1) and (2) above each has the temperature setting means and the pneumatically operated temperature setting means thereof acting on the valve unit along a longitudinal center line axis of the valve unit and the setting means.

It is also known to provide a thermostat construction having a valve actuating lever pivotally mounted to the construction with the temperature setting means and the temperature sensing means of the construction acting on the lever.

For example, see the following item:

(3) U.S. Pat. No. 3,580,502—Duchek

It appears that the thermostat construction of item (3) above has the temperature setting means acting on one side of the pivotally mounted lever thereof and the temperature sensing means acting on the other side thereof.

It is also known to provide a pneumatically operated positioning construction having valve means for directing a pneumatic signal to a positioning chamber thereof in relation to the force differential between a pneumatically operated setting means thereof and a feedback means of the positioning chamber.

For example, see the following item:

(4) Copending patent application Ser. No. 864,374, filed Dec. 27, 1977, now U.S. Pat. No. 4,178,837—Frankenberg It appears that the pneumatically operated positioning construction of item (4) above has the pneumatically operated setting means thereof and the feedback means of the positioning chamber operatively interconnected to the valve unit to act along the longitudinal center line of the valve unit and of the setting means and feedback means.

SUMMARY OF THE INVENTION

It is one feature of this invention to provide an improved pneumatically operated thermostat construction for a vehicle heat exchanger system or the like wherein the thermostat construction utilizes a force-balance system with the forces produced by the set point means and the temperature sensing means thereof being balanced against the force produced by the output pneumatic signal of the thermostat construction.

In particular, it is known that when small sized diaphragms are utilized in pneumatically operated constructions, such small sized diaphragms are difficult to work with because slight variations in the dimensions thereof during the making of the parts cause substantial variations in the mean effective areas of the small diaphragms making repeatability of performance from one pneumatically operated construction to the next pneumatically operated construction questionable.

However, it was found according to the teachings of this invention that a lever could be utilized in a pneumatically operated thermostat construction to permit the use of reasonably sized diaphragms to eliminate or substantially reduce the above problem.

For example, one embodiment of this invention provides a thermostat construction having valve means for directing a pneumatic signal to a pneumatically operated control device in relation to the force differential between the temperature sensing means thereof and the temperature setting of a temperature setting means thereof, a lever being pivotally mounted to the construction and being operatively interconnected to the valve means at a first portion means of the lever and to the temperature setting means and the temperature sensing means at a second portion means of the lever. The temperature setting means is pneumatically operated and includes a flexible diaphragm. Interconnecting means operatively interconnects the diaphragm to the second portion means of the lever. The temperature sensing means comprises a bimetal member carried by the construction and is operatively interconnected to the interconnecting means intermediate the second portion means of the lever and the flexible diaphragm so as to be operatively interconnected by the interconnecting means to the second portion means of the lever.

It was also found that by utilizing the lever in the above manner, the same permits the use of a single die cut diaphragm to provide multiple diaphragms for the thermostat construction rather than requiring the use of a plurality of separate molded diaphragms as in prior known devices.

It is another feature of this invention to provide a pneumatically operated positioning construction for a vehicle heat exchanger system or the like wherein the positioner utilizes a force-balance system so that the force produced by the temperature setting means thereof is balanced against the force produced by the feedback means thereof.

In particular, it was found according to the teachings of this invention that a lever can be utilized in such pneumatically operated positioning construction in substantially the same manner as in the aforementioned pneumatically operated thermostat construction of this invention so that the diaphragms thereof are also of a reasonable size to eliminate or substantially reduce the aforementioned problem.

For example, one embodiment of this invention provides a pneumatically operated positioning construction having valve means for directing a pneumatic signal to a positioning chamber thereof in relation to the force differential between a pneumatically operated setting means thereof and a feedback means of the positioning chamber, a lever being pivotally mounted to the construction and being operatively interconnected to the valve means at a first portion means of the lever and to the setting means and the feedback means at a second portion means of the lever.

In addition, with such a lever arrangement, a single die cut diaphragm can be utilized to provide multiple diaphragms for the positioning construction rather than a plurality of separate molded diaphragms as used in prior known devices.

Accordingly, it is an object of this invention to provide an improved thermostat construction having one or more of the novel features of this invention as set forth above or hereinafter shown or described.

Another object of this invention is to provide a method of making such a thermostat construction or the like, the method of this invention having one or more of the novel features of this invention as set forth above or hereinafter shown or described.

Another object of this invention is to provide an improved pneumatically operated positioning construction having one or more of the novel features of this invention as set forth above or hereinafter shown or described.

Another object of this invention is to provide a method of making such a pneumatically operated positioning construction, the method of this invention having one or more of the novel features of this invention as set forth above or hereinafter shown or described.

Other objects, uses and advantages of this invention are apparent from a reading of the description which proceeds with reference to the accompanying drawings forming a part thereof and wherein:

BRIEF DESCRIPTION OF THE DRAWINGS

FIG. 1 is a schematic view illustrating the pneumatic control system of this invention with the various components thereof being illustrated in cross section, the pneumatic control system being adapted for controlling the heat exchanger means of a transportation vehicle or the like.

DESCRIPTION OF THE PREFERRED EMBODIMENTS

Figure 1:
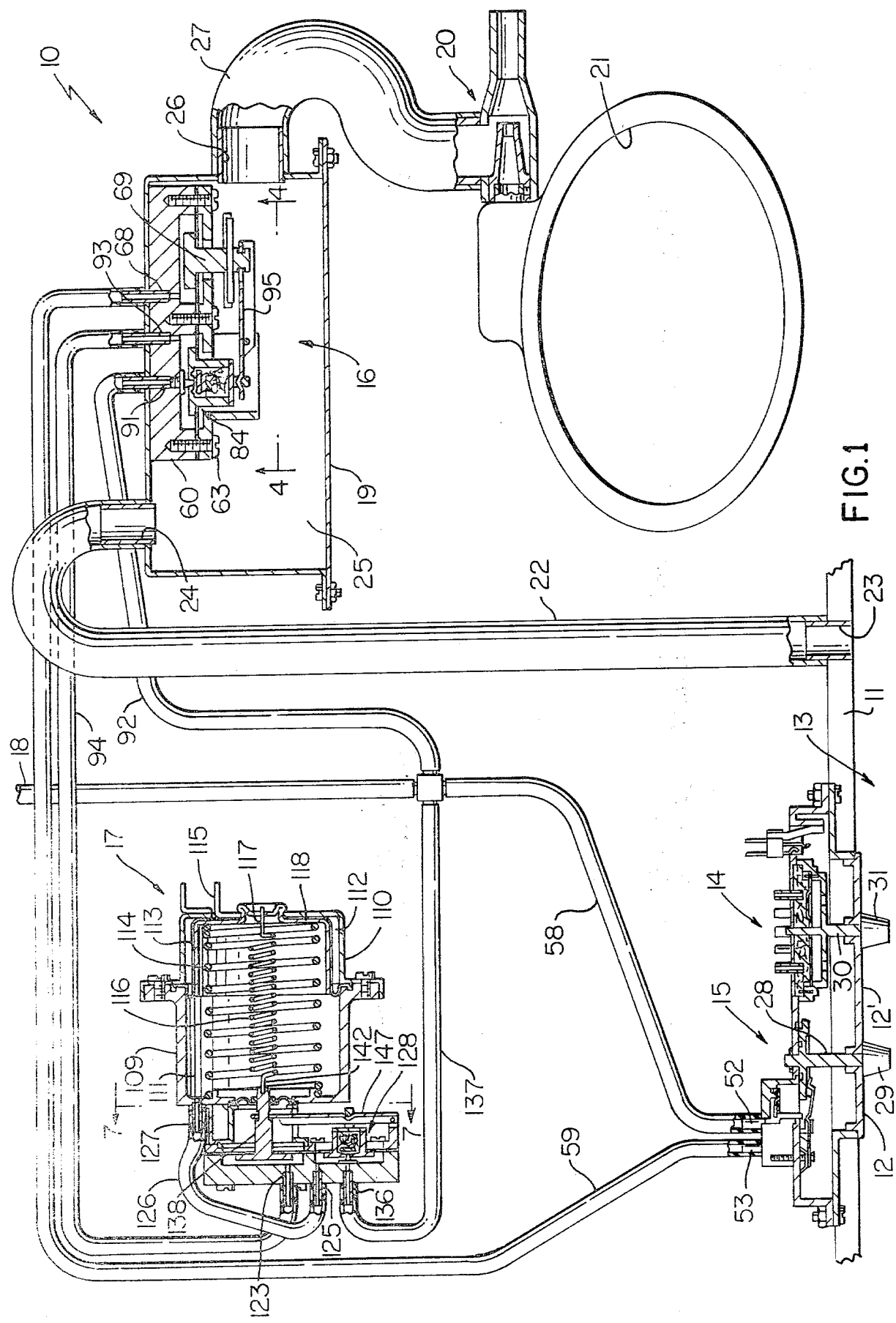

While the various features of this invention are hereinafter described and illustrated as being particularly adapted to provide a thermostat construction and/or a pneumatically operated positioning construction for a pneumatic control system for a heat exchanger means of a transportation vehicle or the like, it is to be understood that the various features of this invention can be utilized singly or in any combination thereof to provide a thermostat construction and/or a pneumatically operated positioning construction for other uses as desired.

Therefore, this invention is not to be limited to only the embodiments illustrated in the drawings, because the drawings are merely utilized to illustrate one of the wide variety of uses of this invention.

Figure 2:
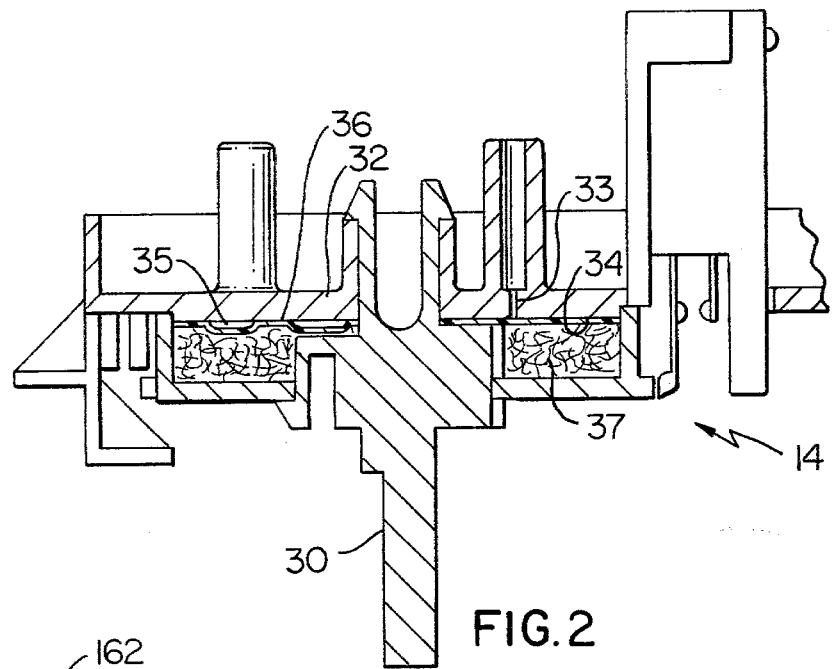
FIG. 2 is an enlarged cross-sectional view of the mode selector of the system of FIG. 1.
Figure 3:
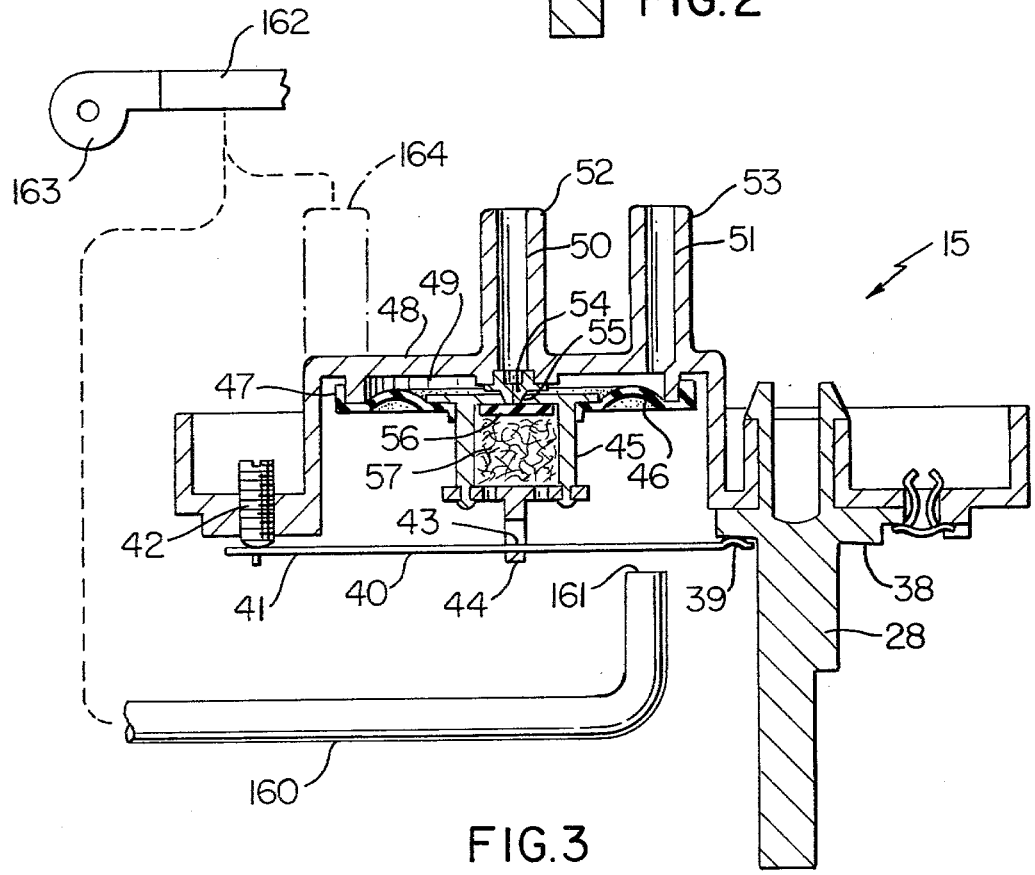
FIG. 3 is an enlarged cross-sectional view of the set point adjuster of the system of FIG. 1, FIG. 3 also schematically illustrating a means of this invention for sensing outside temperature to modify the set point adjuster of FIG. 3.

Referring now to FIG. 1, the improved pneumatic control system for the heat exchanger means of a transportation vehicle is generally indicated by the reference numeral 10 and comprises a conventional dashboard 11 carrying the improved control panel 12 of this invention which is exposed to the passenger compartment that is generally indicated by the reference numeral 13, the control panel 12 including a mode selector that is generally indicated by the reference numeral 14 in FIGS. 1 and 2 and a temperature selector or set point adjuster of this invention that is generally indicated by the reference numeral 15 in FIGS. 1 and 3.

Figure 5:
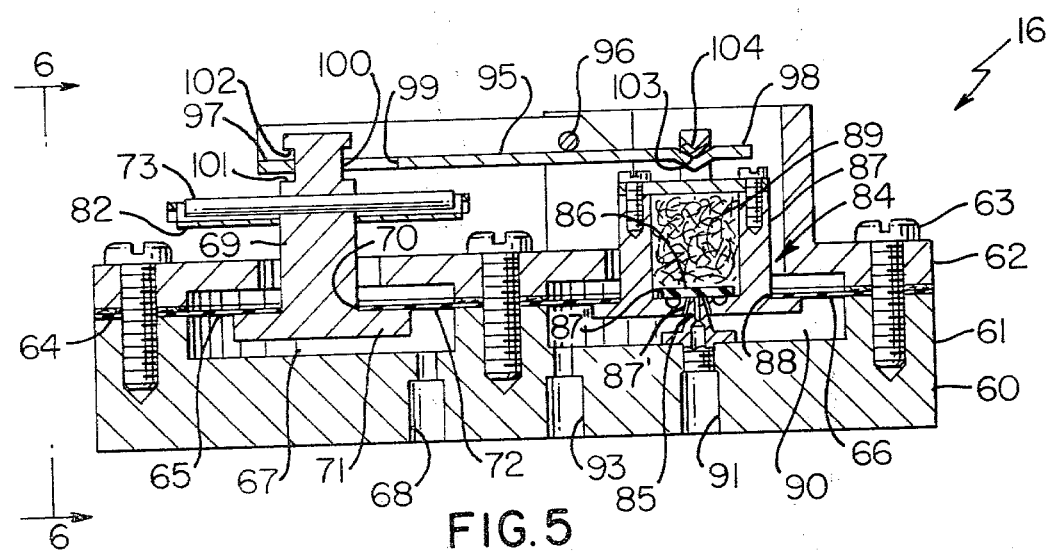
FIG. 5 is a cross-sectional view taken on line 5—5 of FIG. 4.
Figure 6:
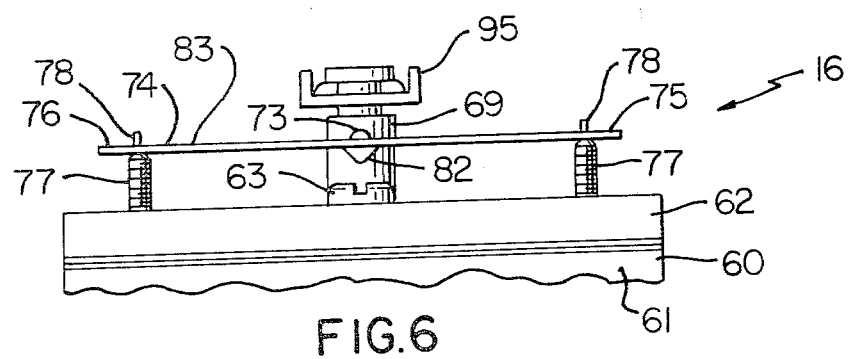
FIG. 6 is an end view of the thermostat construction illustrated in FIG. 5 and is taken in the direction of the arrows 6—6 of FIG. 5.
Figure 7:
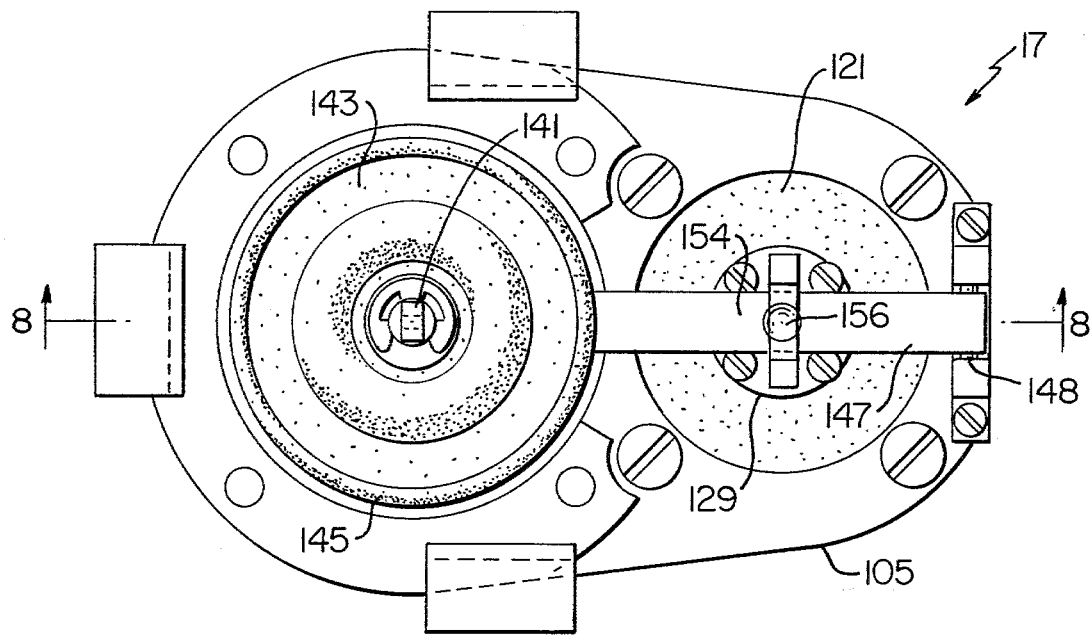
FIG. 7 is a cross-sectional view illustrating part of the pneumatically operated positioning construction of this invention illustrated in the system of FIG. 1 and is taken in the direction of the arrows 7—7 of FIG. 1.
Figure 8:
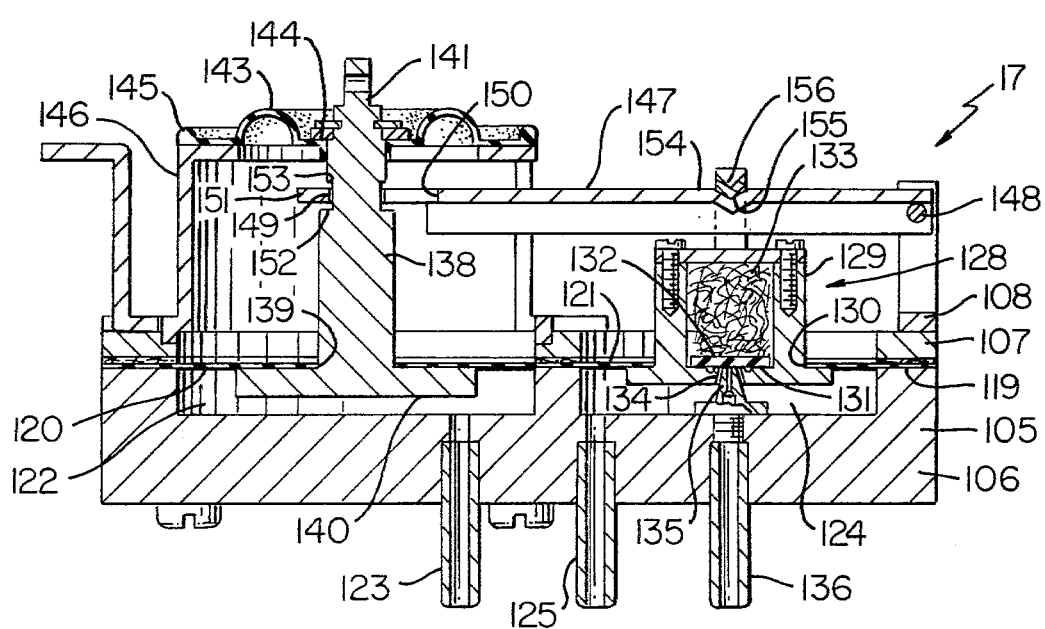
FIG. 8 is a cross-sectional view taken on lines 8—8 of FIG. 7.

The system 10 of this invention also includes an improved thermostat construction of this invention that is generally indicated by the reference numeral 16 in FIGS. 1, 4, 5 and 6 and an improved pneumatically operated positioning construction of this invention that is generally indicated by the reference numeral 17 in FIGS. 1, 7 and 8.

The pneumatically operated positioning construction 17 of this invention is adapted to control a movable damper door (not shown) of a transportation vehicle heat exchanger means (not shown) having a duct for supplying chilled air to a mixed air exit duct that also has a heated air duct interconnected thereto whereby the position of the damper door will determine the temperature of the mixed air leaving the exit duct to the interior 13 of the transportation vehicle in a manner well known in the art and as fully illustrated schematically in the aforementioned copending parent patent application, Ser. No. 864,455.

The system 10 includes a vacuum source conduit 18 which leads to the vacuum manifold (not shown) of the vehicle engine to provide a source of vacuum for the system 10 in a manner hereinafter set forth.

In addition, the thermostat construction 16 of this invention is disposed within a housing means 19 through which air from the passenger compartment 13 can be drawn by an aspirator arrangement 20 that is interconnected to an air inlet means 21 for the conventional blower system for the transportation vehicle.

In particular, the housing 19 is disposed in fluid communication with an intake conduit 22 which has its inlet 23 interrupting the dashboard 11 to be exposed to the passenger compartment 13 and having its outlet 24 disposed in fluid communication with the interior 25 of the housing means 19. The interior 25 of the housing means 19 is also interconnected by an inlet 26 of a conduit means 27 to the aspirator arrangement 20 so that air from the passenger compartment 13 will be drawn through the inlet 23 at the dashboard 11 and through the housing means 19 by the aspirator arrangement 20 so that the temperature of the compartment air will be continuously sensed by the temperature sensing thermostat construction 16 for a purpose hereinafter described. In this manner, the thermostat construction 16 can be located remote from the compartment 13 in an out-of-the-way manner and still sense the temperature thereof.

The set point adjuster 15 has a rotatable control shaft 28 on which can be fastened a rotatable control knob 29, FIG. 1, the knob 29 having an indicator thereon for setting adjacent a circular scale on the front surface 12' of the control panel 12 in order to select the temperature that the control system 10 is to maintain in the interior 13 of the transportation vehicle containing the system 10 in a manner hereinafter described.

The mode selector means 14 has a rotatable control shaft 30 for attaching to a control knob 31, FIG. 1, the control knob 31 also having an indicator means thereon for setting against a circular scale on the front surface 12' of the control panel 12 so that the operator can select the desired mode of operation of the system 10.

While the system 10 of this invention is described as being vacuum operated, such as being provided by the vacuum source 18 of a conventional internal combustion engine transportation vehicle, it is to be understood that the control system 10 of this invention can be pneumatically operated by air pressure rather than by negative air pressure as desired.

The mode selector 14 is a pneumatic selector of a type that can be similar to the selector means illustrated and claimed in the U.S. Pat. No. 3,143,141 to Beck, and the U.S. Pat. No. 3,286,730 to Beck et al, wherein a fixed reading head 32, FIG. 2 is provided with a plurality of passage means 33 that interrupt a reading surface 34 thereof in certain spaced relation and are adapted to be fluidly interconnected together in various selected arrangements thereof as provided by a plurality of channels or blisters 35 formed in a flexible reading member 36 fixed to the rotatable selector means 30 and normally urged toward the reading head 34 by the resiliency of a porous filter means 37.

In this manner, it can be seen that the rotation of the control knob 31 for the selector means 14 will position a different arrangement of the blisters or channel means 35 of the reading sheet 36 relative to the reading surface 34 of the reading head 32 so as to interconnect the passages 33 in different arrangements thereof so that the pneumatic source 18 can be interconnected to various pneumatically operated devices (not shown) to provide for mode selection in the same manner that an electrical mode selector will operate different electrical switches depending upon the rotational position of such mode selector.

Similarly, rotation of the control knob 29 of the set point adjuster 15 of this invention will select the temperature that the system 10 is to maintain whereby the control panel means 12 of this invention does not require the relatively long manually operated lever means of the conventional control panels of transportation vehicles in order to effect the operation of the heat exchanger systems thereof as will be apparent hereinafter.

The set point adjuster 15 of this invention is best illustrated in FIG. 3 wherein the control shaft 28 thereof is rotatably mounted to a housing means 48 that can be fastened to the control panel 12 in any suitable manner. The selector means 28 is provided with a cam surface 38 against which an end 39 of a leaf-spring 40 engages, the leaf-spring 40 having the other end 41 thereof carried by an adjusting member 42 of the housing means 48 so that the intermediate part 43 of the leaf-spring 40 will be bowed against a flange 44 of a rigid cage member 45 of the set point adjuster 15 which, in effect, is a vacuum regulator as will be apparent hereinafter.

The cage member 45 of the set point adjuster 15 is carried by a flexible diaphragm 46 having its outer periphery 47 secured to the housing means 48, the housing means 48 being so shaped that the flexible diaphragm 46 cooperates therewith to define a chamber 49 that is disposed in fluid communication with passage means 50 and 51 respectively formed through a pair of nipples 52 and 53 as illustrated.

The nipple 52 has the passage 50 thereof terminating with a valve seat 54 that is adapted to project through an opening 55 in the cage 45 to be opened and closed by a resilient valve member 56 disposed within the cage 45 and normally being urged toward the opening 55 by the resiliency of a porous filter member 57 disposed within the cage 45.

In this manner, the set point adjuster 15 tends to maintain a certain vacuum value within the chamber 49 thereof based upon the rotational position of the selector means 28 thereof because the rotational setting of the selector means 28 sets the initial force of the spring 40 tending to pull the cage 45 and, thus, the diaphragm 46 downwardly in FIG. 3 in opposition to the pressure differential that acts across the diaphragm 46 and tends to pull the diaphragm 46 upwardly in FIG. 3 when a vacuum condition exists in the chamber 49.

In particular, the nipple 52 of the set point adjuster 15 is adapted to be interconnected to the vacuum source 18 by the conduit means 58 illustrated in FIG. 1 while the nipple 53 of the set point adjuster 15 is adapted to be interconnected by the conduit 59 in FIG. 1 to the thermostat 16 of this invention to operate the same in a manner hereinafter set forth.

Thus, should the vacuum value in the chamber 49 of the set point adjuster 15 exceed the value set by the selector means 28, the excess vacuum in the chamber 49 will cause the diaphragm 46 to move upwardly from the position illustrated in FIG. 3 through the resulting increase in the pressure differential across the diaphragm 46 to cause the valve seat 54 to lift the valve member 56 off of the opening 55 of the cage 45 so that air can enter the chamber 49 through the now opened opening 55 of the cage 45 to reduce the vacuum value in the chamber 49 until the same returns to the vacuum value of the setting of the selector shaft 28, at which time the diaphragm 46 again moves downwardly through the reduced pressure differential acting across the same to permit the valve member 56 to close the opening 55. In contrast, should the vacuum value in the chamber 49 decrease above the setting of the selector shaft 28, the spring 40 will pull the cage 45 and, thus, the diaphragm 46 downwardly in FIG. 3 to open the valve member 55 away from the valve seat 54 so that the vacuum source 25 can further evacuate the chamber 49 to increase the vacuum value thereof back to the vacuum value as selected by the selector means 28 at which time the diaphragm 46 again moves upwardly through the increased pressure differential across the same to have the valve member 56 close the valve seat 54.

In this manner, it can be seen that the set point adjuster 15 is, in effect, a vacuum regulator which will provide a vacuum value in the chamber 49 thereof that corresponds to the setting of the selector shaft 28 thereof for a purpose hereinafter described. However, the set point adjuster 15 of this invention is also adapted to automatically adjust itself according to outside temperature as will be apparent hereinafter by having the spring member 40 thereof also comprise a bimetal member for a purpose hereinafter described.

Figure 4:
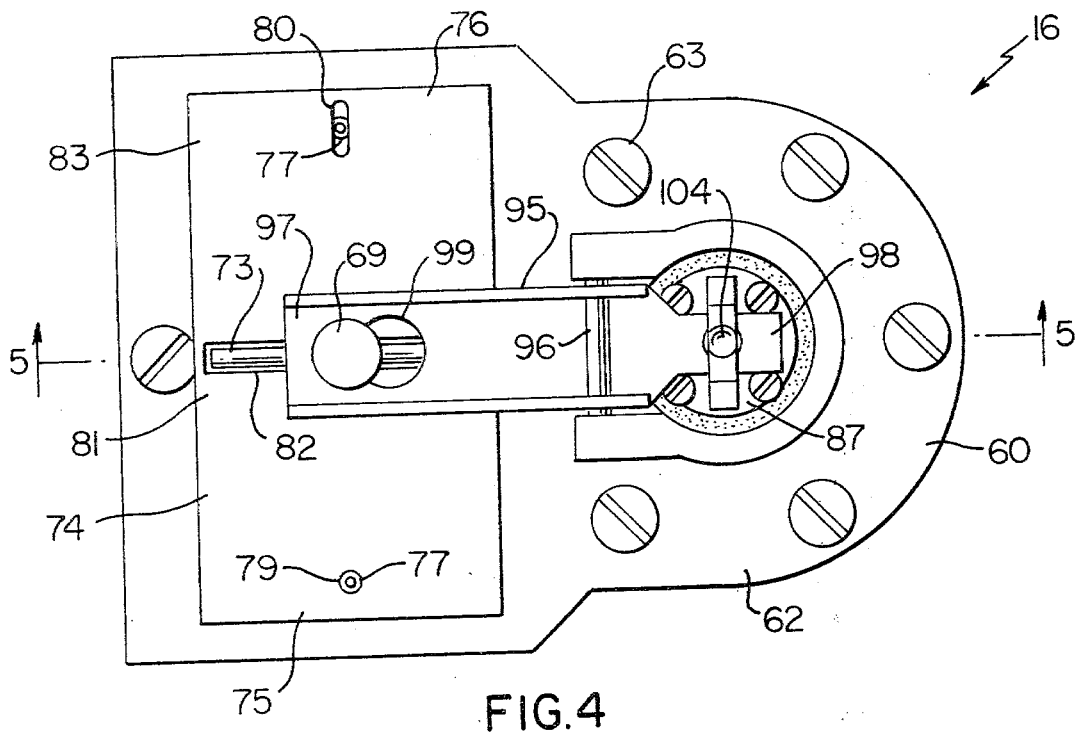
FIG. 4 is an enlarged end view of the improved thermostat construction of this invention illustrated in FIG. 1 and taken in the direction of the arrows 4—4 of FIG. 1.

The improved thermostat construction 16 of this invention is best illustrated in FIGS. 4-6 and comprises a housing means 60 formed of two parts 61 and 62 secured together by suitable fastening means 63 and sandwiching therebetween a one-piece die cut flexible diaphragm member 64 which cooperates with the housing members 61 and 62 to define two operative coplanar diaphragms 65 and 66 with the diaphragm 65 comprising a pneumatic temperature setting means for the thermostat construction 16 in a manner hereinafter described and the diaphragm 66 comprising a feedback means for the thermostat construction 16 as will be apparent hereinafter.

The diaphragm 65 cooperates with the housing means 60 to define a chamber 67 which is adapted to be interconnected by a passage means 68 to the conduit 59, FIG. 1, that leads from the set point adjuster 15 so that the vacuum signal being set by the set point adjuster 15 will also be created in the chamber 67 of the thermostat construction 16 to set the temperature setting thereof as will be apparent hereinafter.

A post-like member 69 passes through an opening 70 in the diaphragm 65 so that an enlarged end 71 of the post-like member 69 will bear against the side 72 of the diaphragm 65 and be secured thereto in any suitable manner so that the post-like member 69 will move upwardly and downwardly in unison with the diaphragm 65 in FIG. 5 depending upon the value of the pressure differential acting upon the diaphragm 65 as will be apparent hereinafter.

The post-like member 69 carries a pin 73 which extends outwardly and transversely relative thereto for operatively interconnecting the post-like member 69 to a bimetal member 74 that has its opposed ends 75 and 76 respectively carried by the housing means 60 of the thermostat construction 16.

In particular, it can readily be seen in FIG. 6 that the housing means 60 has a pair of upwardly directed adjusting screw-like members 77 that have reduced ends 78 respectively adapted to project through openings 79 and 80 in the ends 75 and 76 of the bimetal member 74, the opening 80 being an elongated slot to permit bowing movement of the bimetal member 74 as will be apparent hereinafter.

A medial portion 81 of the bimetal member 74 is provided with a V-shaped embossment 82 in the upper side 83 thereof to receive the pin 73 of the post-like member 69 therein so that upward and downward bowing movement of the bimetal member 74 is transmitted to the post-like member 69 as will be apparent hereinafter, such bowing movement of the bimetal member 74 being in relation to the temperature sensed thereby.

The thermostat construction 16 includes a valve means that is generally indicated by the reference numeral 84 and comprises a fixed valve seat 85 and a movable valve member 86 disposed within a cup-shaped cage-like member 87 disposed and secured within an opening 88 in the diaphragm 66 so as to be carried thereby, the fixed valve seat 85, cage 87, valve member 86 and porous filter material 89 in the cage 87 being substantially the same and functioning in the same manner as the fixed valve seat 54, cage 45, movable valve member 56 and filter material 57 previously described in connection with the set point adjuster 15 so as to provide a regulated vacuum within a branch chamber 90 formed between the diaphragm 66 and the housing means 60.

In particular, the fixed valve seat 85 is adapted to project through the opening 87' of the cage 87 to be controlled by the valve member 86 and is adapted to be interconnected by a passage 91 in the housing means 60 to the vacuum source conduit 18, FIG. 1, by a branch conduit 92 as illustrated in FIG. 1.

The chamber 90 of the thermostat construction 16 is adapted to be interconnected by a passage 93 in the housing means 60 to the pneumatically operated positioning construction 17 by a conduit 94 as illustrated in FIG. 1 for a purpose hereinafter described.

A lever 95 is pivotally mounted to the housing means 60 of the thermostat construction 16 by a pivot pin means 96 of the lever 95 that is carried thereby intermediate the opposed ends 97 and 98 of the lever 95.

The end 97 of the lever 95 is operatively interconnected to the temperature sensing bimetal 74 and to the pneumatically operated temperature setting diaphragm 65 by having a keyway opening 99 passing therethrough and receiving a reduced portion 100 of the post-like member 69 therein in the manner illustrated in FIGS. 4 and 5 so that the end 97 of the lever 95 is disposed between a pair of opposed spaced annular shoulders 101 and 102 on the post-like member 69 that provide a lost motion interconnection therebetween.

The other end 98 of the lever 95 is operatively interconnected to the valve means 84 of the thermostat construction 16 by having a V-shaped notch 103 thereof bearing against a V-shaped flange 104 of the cage 87 so that pivoting movement of the lever 95 is transmitted to the cage 87 of the valve means 84 as will be apparent hereinafter.

Therefore, it can be seen that the set point diaphragm 65 and the temperature sensing bimetal 74 are connected to the lever 95 on one side 97 of the fulcrum or pivot means 96 of the lever 95 and the branch or feedback diaphragm 66 and cage 87 and, thus, the valve means 84, are connected to the lever 95 on the other side 98 of the fulcrum or pivot means 96 of the lever 95.

The lever ratio can be selected so as to permit the use of a reasonably sized feedback diaphragm 66 for the reasons previously set forth and the use of the lever 95 permits the use of a single die cut diaphragm member 64 for forming both of the diaphragms 65 and 66 previously described.

Thus, it can be seen that the thermostat construction 16 of this invention can be formed of a relatively few parts in a relatively simple manner by the method of this invention to operate in a manner now to be described.

If the system of the thermostat construction 16 is balanced as illustrated in FIG. 5 and a temperature change is sensed by the bimetal member 74 to cause the upward force in FIG. 5 generated by the bimetal member 74 to decrease, the lever 95 will rotate counterclockwise in FIG. 5 a slight amount, due to the effect of the vacuum in the chamber 67 tending to pull the diaphragm 65 downwardly in opposition to the upward biasing force of the bimetal member 74, thereby lifting the cage 87 upwardly and, thus, its valve member 86 off the valve seat 85, through the upward movement of the cage 87 being carried by the end 98 of the lever 95, so that the chamber 90 can be further evacuated by the vacuum source 18. This increase in the vacuum level beneath the diaphragm 66 in the chamber 90 is transmitted by the conduit 94 to the pneumatically operated positioning construction 17 to change the operating position thereof as will be apparent hereinafter, the increased vacuum in the chamber 90 in effect pulling downwardly on the feedback diaphragm 66 to thereby again balance the thermostat construction 16 by causing the lever 95 to return back in a clockwise direction to the position illustrated in FIG. 5 and thereby maintain the new vacuum level in the branch chamber 90 thereof until the bimetal member 74 senses another change in temperature or the vacuum level in the setting chamber 67 is changed by a change in the setting of the set point adjuster 15.

However, if a temperature change causes the upward bimetal force of the bimetal member 74 to increase, this results in a clockwise movement of the lever 95 about the pivot point 96 in FIG. 5 to move the cage 87 downwardly relative to the fixed valve seat 85 and lift the valve member 86 off its seating relation with the surface 87" of the cage 87 and admit air into the chamber 90 through the now opened opening 87'. This lowers the vacuum level in the branch chamber 90 and such change in the branch signal being directed to the positioner 17 by the conduit 94 causes the positioner 17 to change its position as will be apparent hereinafter. In addition, the lowering of the vacuum level in the branch chamber 90 reduces the pressure differential acting across the feedback diaphragm 66 so that the feedback diaphragm 66 returns the lever 95 in a counterclockwise direction to again place the lever 95 and, thus, thermostat construction 16 in the balanced condition illustrated in FIG. 5.

Changes in the vacuum level of the set point signal being directed to the set point chamber 67 of the thermostat construction 16 by the set point adjuster 15 change the force requirements of the bimetal member 74 to effect the system balance and, accordingly, set the temperature at which the thermostat 16 is to be in balance as will be apparent hereinafter.

The improved pneumatically operated positioning construction 17 of this invention is best illustrated in FIGS. 1, 7 and 8 and comprises a housing means 105 formed from a plurality of parts 106, 107, 108, 109 and 110 suitably secured together, the parts 109 and 110 cooperating together to define a pair of chambers 111 and 112 therein and separated by a rolling diaphragm means 113 normally urged to its extended condition illustrated in FIG. 1 by a compression spring 114 disposed within the chamber 111.

The diaphragm 113 of the positioning construction 17 carries an arm or piston member 115 for controlling any suitable structure, such as the aforementioned duct damper previously described and as fully illustrated in the copending parent patent application Ser. No. 864,455.

The chamber 111 of the positioning construction 17 also includes a tension feedback spring 116 disposed concentrically within the compression spring 114 and having one end 117 secured to the diaphragm backup cup 118 in a manner fully set forth in the aforementioned copending parent patent application, Ser. No. 864,455, whereby the details of setting the force of the tension spring 116 need not be described in this present disclosure as the feature of the present disclosure is directed to the improvement in the means for controlling the vacuum level in the chamber 111 as will be apparent hereinafter.

The housing means 105 includes a flexible diaphragm member 119 sandwiched between the housing parts 106 and 107 in the same manner as the diaphragm member 64 of the thermostat construction 16 previously described to cooperate with the housing means 105 and define a pneumatically operated setting diaphragm 120 and a feedback diaphragm 121 disposed coplanar therewith, the diaphragm 120 cooperating with the housing means 105 to define a pneumatic chamber 122 interconnected externally thereto by the nipple means 123 and the diaphragm 121 cooperating with the housing means 105 to define an output or branch chamber 124 adapted to be interconnected externally of the housing means 105 by a nipple 125.

The nipple 123 for the pneumatic setting chamber 122 is interconnected to the conduit 94, FIG. 1, so as to receive the pneumatic output signal of the thermostat device 16 for a purpose hereinafter described.

The nipple 125 for the output chamber 124 of the positioning means 17 is interconnected by a branch conduit 126, FIG. 1, to a nipple 127 of the housing means 105 that is in fluid communication with the positioning chamber 111 of the positioning construction 17 as illustrated for a purpose hereinafter described.

The positioning construction 17 includes a valve means that is generally indicated by the reference numeral 128 in FIG. 8 and comprises a cup-shaped cage member 129 carried and secured in an opening 130 of the feedback diaphragm 121. The cage 129 has a valve seat 131 adapted to be opened and closed by a movable valve member 132 disposed within the cup-like cage member 129 and urged to its closed position by the filtering material 133 as illustrated, the valve seat 131 being interrupted by an opening 134 passing through the cup-like cage 129 and being adapted to receive a fixed valve seat 135 therein. The fixed valve seat 135 is interconnected externally of the housing means 105 by a nipple 136 that is adapted to be interconnected to the vacuum source 18, FIG. 1, by a branch conduit means 137.

The valve means 128 of the positioning construction 17 operates in the same manner as the valve means 84 of the thermostat construction 16 and valve means of the set point adjuster 15 previously described so that only the general operation thereof will be hereinafter set forth.

A post-like member 138 is telescoped through an opening 139 in the diaphragm 120 and has an enlarged disc-like end 140 bearing against the diaphragm 120 and being secured thereto in any suitable manner so that the post-like member 138 will move in unison with the diaphragm 120, the post-like member 138 having a free end 141 interconnected to the other end 142, FIG. 1, of the feedback tension spring 116 so that the force of the tension spring 116 as well as the force of the diaphragm 120 are imposed upon the post-like member 138 to tend to move the same relative to the housing means 105 as will be apparent hereinafter.

In addition, a feedback diaphragm 143 has its inner periphery 144 secured to the post-like member 138 and its outer periphery 145 secured between the housing part 109 and an intermediate housing part 146 to seal closed the positioning chamber 111 from the exterior of the housing means 105 whereby the force of the feedback diaphragm 143 is also imposed on the post-like member 138 to tend to position the same relative to the housing means 105 as will be apparent hereinafter.

A lever 147 has a pivot pin or pivot means 148 thereof pivoted to the housing part 108 and telescopically receives a reduced portion 149 of the post-like member 138 in a keyway opening 150 in the end 151 thereof to operatively interconnect the lever 147 to the post-like member 138 through a lost motion means defined by spaced apart annular shoulders 152 and 153 of the post-like member 138 in a manner similar to the interconnection of the post-like member 69 of the thermostat construction 16 to the lever 95 as previously described.

A portion 154 of the lever 147 intermediate the end 151 thereof and the pivot means 148 is adapted to be operatively interconnected to the valve means 128 by having a V-shaped embossment 155 provided therein and receiving a V-shaped flange 156 of the cage-like member 129 therein to interconnect the lever 147 to the valve means 128 in a manner similar to the interconnection of the lever 95 of the thermostat construction 16 to the valve means 84 as previously described.

Thus, it can be seen that the improved pneumatically operated positioning construction 17 of this invention can be formed of a relatively few parts in a simple manner by the method of this invention so that the positioning construction 17 utilizes a force-balance system wherein the force produced by the thermostat construction 16 and fed to the chamber 122 of the positioning apparatus 17 through the conduit means 94 is balanced against the force produced by the feedback spring 116 as the effective areas of the diaphragms 121 and 143 and lever ratios of the lever 147 are selected to make the moment produced by the branch vacuum acting on the diaphragm 143 equal to the moment produced by the branch vacuum acting on diaphragm 121.

In particular, an increase in the vacuum level of the thermostat output signal admits air to the branch chamber 124 because the diaphragm 120 is moved downwardly in FIG. 8 in response to the increased vacuum signal in the chamber 122 causing a counterclockwise movement of the lever 147 so that the cage 239 moves downwardly and causes the fixed valve seat 135 to move the valve member 132 off the valve seat 131 and interconnect air through the now opened opening 134 to the branch chamber 124. This lowers the vacuum level in the branch chamber 124 and, thus, the vacuum level in the chamber 111 of the positioning construction 17 so that the compression spring 114 tends to move or extend the diaphragm 113 further to the right in FIG. 1. However, movement of the diaphragm 113 to the right elongates the feedback tension spring 116 to increase its force pulling upwardly in FIG. 8 on the post-like member 138 to tend to pivot the lever 147 back in a clockwise direction to again balance the system.

A decrease in the vacuum level of the thermostat signal to the chamber 122 causes the diaphragm 120 to be moved upwardly in FIG. 8 and thereby move the lever 147 in a clockwise direction to pull the valve member 132 away from the fixed valve seat 135 and thereby increase the vacuum to the branch chamber 124 and, thus, the vacuum to the positioning chamber 111. The increase of vacuum in the positioning chamber 111 causes the diaphragm 113 to be pulled to the left in FIG. 1 and thereby decrease the force of the tension spring 116 tending to pull the post-like member 138 upwardly in FIG. 8 so that the post-like member 138 in FIG. 8 moves downwardly to rotate the lever 147 back to its balanced position for balancing the system.

The areas of the branch balancing diaphragm 143 and the feedback diaphragm 121 and the lever ratios of the lever 147 are selected to make the moment produced by a branch vacuum in the chamber 111 of the positioning construction acting on the balancing diaphragm 143 equal to the moment produced by the branch vacuum acting on the relay diaphragm 121. Accordingly, the position assumed by the piston cup 118 is determined solely by the forces produced by the thermostat signal in the chamber 122 and the force of the feedback spring 116 and is independent of the level of the branch vacuum in the chamber 124 and in the positioning chamber 111 that is required to position the piston 118 to the final position thereof.

From the above, it can be seen that the thermostat construction 16 and the positioning construction 17 of this invention both utilize a pivotally mounted lever to permit the same to operate in the system 10 and control the heat exchange function of a transportation vehicle or the like in a manner now to be described.

Assuming that the operator has set the selector means 30 of the mode selector 14 to the desired operating condition thereof, the operator can turn the control knob 29 of the set point adjuster 15 to the desired output temperature effect that the heat exchanger of the system 10 is to maintain.

For example, the operator can set the control knob 29 for a 72° setting whereby the system 10 will tend to maintain the output effect of the heat exchanger at approximately 72° F. as long as the temperature outside the vehicle containing the system 10 is about 75° F. as will be apparent hereinafter.

In particular, the rotation of the selector knob 29 to the desired temperature setting thereof sets the cam surface 38 of the selector means 28 thereof so that the spring 40 is set to tend to maintain a vacuum value in the chamber 49 of the vacuum regulator 15 that will correspond to a vacuum value that will set the thermostat 16 to a 72° setting thereof as previously described. In this manner, should the thermostat 16 sense a temperature other than a 72° temperature for the output effect of the heat exchanger, the thermostat 16 in the manner previously described will cause the positioner 17 to change the position of its piston 118 and, thus, the position of the damper of the heat exchanger to a position which will produce an output temperature effect of approximately 72°.

Therefore, it can be seen that the system 10 through the setting of the selector shaft 28 of the vacuum regulator or set point adjuster 15 creates a vacuum value in the chamber 49 thereof which corresponds to a particular temperature setting, such vacuum value in the chamber 49 of the set point adjuster 15 creating that vacuum value in the chamber 67 of the thermostat 16 so that the thermostat 16 will tend to create a vacuum value in the chamber 90 thereof which corresponds to the selected temperature setting. The vacuum value in the chamber 90 of the thermostat 16 tends to create that vacuum value in the chamber 122 of the positioner 17 to cause the positioner 17 to create a vacuum value in the branch chamber 124 thereof and, thus, in the positioning chamber 111 thereof that will position the diaphragm 113 to continue to create the selected output temperature effect of the heat exchanger means to maintain the bimetal member 74 of the thermostat construction 16 at the 72° setting thereof as caused by the set point adjuster 15.

For example, should the output temperature effect being sensed by the bimetal member 74 of the thermostat construction 16 fall below the desired 72° F. setting that corresponds to the set vacuum value in the chamber 67 thereof, the bimetal member 74 warps in a manner to move the post-like member 69 downwardly to pivot the lever 95 counterclockwise in FIG. 5 to move the valve member 86 away from the valve seat 85 to thereby permit the vacuum source 18 to increase the vacuum value in the chamber 90. This increase in the vacuum value in the chamber 90 causes a corresponding increase in the vacuum value in the chamber 122 of the positioning construction 17. The increase in the vacuum value in the chamber 122 causes the lever 147 to pivot counterclockwise in FIG. 8 and move the cage 129 downwardly and thereby interconnect air through the now open opening 134 of the cage 129 to the chamber 124 and thereby reduce the vacuum value in the output chamber 124 and, thus, in the positioning chamber 111 of the pneumatically operated positioning construction 17.

The reduction of the vacuum value in the chamber 111 of the device 17 decreases the pressure differential across the diaphragm 113 and permits the compression spring 114 to move the diaphragm 113 to the right in FIG. 1 to a new position thereof to cause the duct damper to permit more heated air to be directed into the passenger compartment 13 to thereby increase the output temperature effect of the vehicle heat exchanger means that will be sensed by the bimetal member 74 of the thermostat 16.

As previously stated, the increase in the vacuum value in the chamber 90 of the thermostat construction 16 causes the feedback diaphragm 66 to move downwardly and again balance the thermostat construction 16 by closing the valve member 86 against the valve seat 85. Similarly, the reduction of the vacuum value in the chamber 124 acting on the feedback diaphragm 121 of the positioning construction 17 is balanced by the reduction of the vacuum value in the positioning chamber 111 acting on the feedback diaphragm 143 so that the feedback spring 116 through its elongation by the rightward moved diaphragm 113 pivots the lever 147 clockwise in FIG. 8 to close the vent opening 134 with the valve member 132 and thereby again balance the positioning construction 17.

Conversely, an increase in the output temperature effect being sensed by the bimetal member 74 above the 72° F. position thereof will cause the bimetal member 74 to warp upwardly in FIG. 5 and move the lever 95 clockwise and thereby move the cage 87 downwardly so that the valve seat 85 will move the valve member 86 away from the opening 87' to thereby permit the atmosphere to bleed into the chamber 90 through the now open opening 87' to decrease the vacuum value in the chamber 90 thereof. This decrease in the vacuum value of the chamber 90 of the thermostat construction 16 causes a similar reduction in the vacuum value in the chamber 122 of the positioning construction 17 to pivot the lever 147 clockwise in FIG. 8 to open the valve seat 135 and increase the vacuum value in the chamber 124 and, thus, in the chamber 111. This increase in the vacuum value in the chamber 111 causes a resulting increase in pressure differential across the diaphragm 113 that causes the diaphragm 113 to move to the left in FIG. 1 in opposition to the force of the compression spring 114 to set the duct damper to a position to permit more chilled air into the passenger compartment 13 than before to thereby reduce the output temperature effect of the vehicle heat exchanger means.

As previously stated, the decrease in the vacuum value in the chamber 90 of the thermostat construction 16 causes the feedback diaphragm 66 to move upwardly in FIG. 5 and again balance the thermostat construction 16 by closing the valve member 86 against the opening 87' of the cage 87. Similarly, the increase in the vacuum value in the positioning chamber 111 of the positioning construction 17 contracts the tension spring 116 so the lever 147 can pivot counterclockwise in FIG. 8 to close the valve member 132 against the valve seat 135 and thereby again balance the positioning construction 17.

Therefore, it can be seen that the system 10 of this invention will tend to maintain the output temperature effect in the interior of the vehicle containing the same at the temperature setting of the set point adjuster 15 which is mounted on the dash board 11 of the vehicle while the thermostat construction 16 can be mounted anywhere remotely therefrom to sense the output temperature effect of the heat exchanger means in the passagenger compartment 13.

However, as previously described, the set point adjuster 15 of this invention is adapted to be automatically adjusted in relation to the temperature outside of the vehicle because it has been found that when the outside temperature falls to around 0° F., even though the inside temperature is being maintained at 72° F., it feels colder inside the vehicle whereby it is desired that the actual output temperature effect in the vehicle will be at some increased temperature from the setting thereof when the outside temperature is 0° F. than when the outside temperature is 75° F.

Therefore, it can be seen in FIG. 3 that a conduit means 160 is positioned to have its outlet 161 adjacent the bimetal spring member 40 of the set point adjuster 15 with the conduit 160 being interconnected to an outside air duct 162 of a blower 163 that supplies outside air to the heat exchanger system 10.

Thus, outside air is continuously being directed by the blower 163 through the sensing tube 160 to the bimetal member 40 of the set point adjuster 15 so that the bimetal member 40 is constantly sensing the outside temperature.

In this manner, as long as the outside temperature being sensed by the bimetal member 40 of the set point adjuster 15 is around 75°, the 72° setting of the selector means 28 thereof will produce an actual output temperature effect in the vehicle at around 72° F. in the manner previously described.

However, the bimetal member 40 is so selected that the same will create a temperature setting for the set point adjuster 15 approximately 5° higher than the actual cam setting 38 of the selector means 28 when the outside temperature has fallen to approximately 0° F. so that when the outside temperature is approximately 0° F., the bimetal member 40 will cause the vacuum value in the chamber 49 thereof to be almost the same as if the selector means 28 had been set for 77° F. whereby the system 10 will tend to maintain the output temperature effect of the heat exchanger means for the vehicle containing the system 10 at approximately 77° F. in the manner previously described.

Thus, it can be seen that by forming the spring member 40 of the set point adjuster 15 of this invention from a bimetal member and having the same sense outside temperature through the small tube 160, the set point adjuster 15 will automatically adjust the temperature setting thereof between a range of approximately 0° F. from the actual temperature setting of the sensing means 28 when the outside temperature is approximately 75° F. to an increase of the temperature setting of the adjuster 15 of approximately 5° above the actual cam setting of the selector means 28 when the outside temperature falls to approximately 0° F.

If desired, the conduit means 160 could be interconnected to the housing means 48 of the set point adjuster 15 through the use of another nipple means of the housing means 48 as indicated by the dash-dotted lines 164 in FIG. 3.

In any event, it can be seen that the set point adjuster 15 includes means for sensing the outside temperature in order to automatically modify the manual temperature setting thereof.

From the above, it can be seen that the invention not only provides an improved thermostat construction and/or positioning construction, but also this invention provides improved methods of making such a thermostat construction and/or positioning construction.

While the forms and methods of this invention now preferred have been illustrated and described as required by the Patent Statute, it is to be understood that other forms and method steps can be utilized and still fall within the scope of the appended claims.

What is claimed is:

1. In a thermostat construction having a valve means for directing a pneumatic signal to a pneumatically operated control device in relation to the force differential between the temperature sensed by a temperature sensing means thereof and the temperature setting of a temperature setting means thereof, a lever having a pivot means thereof pivotally mounted to said construction, said lever being operatively interconnected to said valve means at a first portion means of said lever and to said temperature setting means and said temperature sensing means at a second portion means of said lever, the improvement wherein said temperature setting means is pneumatically operated and includes a flexible diaphragm, and interconnecting means operatively interconnecting said diaphragm to said second portion means of said lever, said temperature sensing means comprising a bimetal member carried by said construction and being operatively interconnected to said interconnecting means intermediate said second portion means of said lever and said flexible diaphragm to be operatively interconnected thereby to said second portion means of said lever.

2. A thermostat construction as set forth in claim 1 wherein said bimetal member has opposed ends respectively carried by said construction, said bimetal member having a portion thereof intermediate said ends thereof operatively interconnected to said interconnecting means.

3. A thermostat construction as set forth in claim 2 wherein said interconnecting means comprises a post-like member carrying a pin means, said bimetal member having an opening passing through said portion thereof and telescopically receiving said post-like member therethrough, said pin means bearing against said portion of said bimetal member adjacent said opening to operatively interconnect said bimetal member to said post-like member.

4. A thermostat construction as set forth in claim 1 wherein said valve means comprises a fixed valve seat carried by said construction and a movable valve member controlling said valve seat and being operatively interconnected to said first portion means of said lever.

5. A thermostat construction as set forth in claim 1 wherein said pivot means of said lever is intermediate said first and second portion means of said lever.

6. A thermostat construction as set forth in claim 1 wherein said second portion means of said lever comprises a single effective point thereof.

7. In a thermostat construction having valve means for directing a pneumatic signal to a pneumatically operated control device in relation to the force differential between the temperature sensed by a temperature sensing means thereof and the temperature setting of a temperature setting means thereof, a lever having a pivot means thereof pivotally mounted to said construction, said lever being operatively interconnected to said valve means at a first portion means of said lever and to said temperature setting means and said temperature sensing means at a second portion means of said lever, the improvement wherein said temperature setting means is pneumatically operated and includes a flexible diaphragm, interconnecting means operatively interconnecting said diaphragm to said second portion means of said lever, said valve means comprising a fixed valve seat carried by said construction and a movable valve member controlling said valve seat and being operatively interconnected to said first portion means of said lever, and another flexible diaphragm being carried by said construction and cooperating with said valve seat to define a chamber, said other diaphragm having an opening passing therethrough and leading to said chamber, a rigid cup-like member being carried by said other diaphragm and being disposed in said opening thereof, said valve member being movably carried in said cup-like member to control said valve seat, said cup-like member being operatively interconnected to said first portion means of said lever.

8. A thermostat construction as set forth in claim 7 wherein said diaphragms are disposed in the same plane in said construction.

9. A thermostat construction as set forth in claim 8 wherein said diaphragms are a one-piece structure.

10. In a method of making a thermostat construction having valve means for directing a pneumatic signal to a pneumatically operated control device in relation to the force differential between the temperature sensed by a temperature sensing means thereof and the temperature setting of a temperature setting means thereof, a lever having pivot means thereof pivotally mounted to said construction, said lever being operatively interconnected to said valve means at a first portion means of said lever and to said temperature setting means and said temperature sensing means at a second portion means of said lever, the improvement comprising the steps of forming said temperature setting means to be pneumatically operated and include a flexible diaphragm, operatively interconnecting said diaphragm to said second portion means of said lever with interconnecting means, forming said temperature sensing means from a bimetal member carried by said construction, and operatively interconnecting said bimetal member to said interconnecting means intermediate said second portion means of said lever and said flexible diaphragm to be operatively interconnected thereby to said second portion means of said lever.

11. A method of making a thermostat construction as set forth in claim 10 and including the steps of forming said bimetal member to have opposed ends respectively carried by said construction, and operatively interconnecting a portion of said bimetal member intermediate said ends thereof to said interconnecting means.

12. A method of making a thermostat construction as set forth in claim 11 and including the steps of forming said interconnecting means from a post-like member carrying a pin means, forming said bimetal member with an opening passing through said portion thereof and telescopically receiving said post-like member therethrough, and causing said pin means to bear against said portion of said bimetal member adjacent said opening to operatively interconnect said bimetal member to said post-like member.

13. A method of making a thermostat construction as set forth in claim 10 and including the step of forming said valve means to comprise a fixed valve seat carried by said construction and a movable valve member controlling said valve seat and being operatively interconnected to said first portion means of said lever.

14. A method of making a thermostat construction as set forth in claim 10 and including the step of forming said pivot means of said lever to be intermediate said first and second portion means of said lever.

15. A method of making a thermostat construction as set forth in claim 10 and including the step of forming said second portion means of said lever to comprise a single effective point thereof.

16. In a method of making a thermostat construction having valve means for directing a pneumatic signal to a pneumatically operated control device in relation to the force differential between the temperature sensed by a temperature sensing means thereof and the temperature setting of a temperature setting means thereof, a lever having pivot means thereof pivotally mounted to said construction, said lever being operatively interconnected to said valve means at a first portion means of said lever and to said temperature setting means and said temperature sensing means at a second portion means of said lever, the improvement comprising the steps of forming said temperature setting means to be pneumatically operated and to include a flexible diaphragm, operatively interconnecting said diaphragm to said second portion means of said lever with interconnecting means, forming said valve means to comprise a fixed valve seat carried by said construction and a movable valve member controlling said valve seat and being operatively interconnected to said first portion means of said lever, providing another flexible diaphragm to be carried by said construction and cooperate with said valve seat to define a chamber, forming said other diaphragm to have an opening passing therethrough and leading to said chamber, providing a rigid cup-like member to be carried by said other diaphragm and be disposed in said opening thereof, disposing said valve member to be movably carried in said cup-like member to control said valve seat, and operatively interconnecting said cup-like member to said first portion means of said lever.

17. A method of making a thermostat construction as set forth in claim 16 and including the step of disposing said diaphragms to be in the same plane in said construction.

18. A method of making a thermostat construction as set forth in claim 17 and including the step of forming said diaphragms to be a one-piece structure.

* * * * *